(12) United States Patent
Ackerman et al.

(10) Patent No.: US 7,208,230 B2
(45) Date of Patent: *Apr. 24, 2007

(54) OPTICAL REFLECTOR FOR REDUCING RADIATION HEAT TRANSFER TO HOT ENGINE PARTS

(75) Inventors: John Frederick Ackerman, Laramine, WY (US); Paul Vincent Arszman, Cincinnati, OH (US); Bangalore Aswatha Nagaraj, West Chester, OH (US); Nicole Justis, San Diego, CA (US)

(73) Assignee: General Electric Company, Schenectady, NY (US)

( * ) Notice: Subject to any disclaimer, the term of this patent is extended or adjusted under 35 U.S.C. 154(b) by 454 days.

This patent is subject to a terminal disclaimer.

(21) Appl. No.: 10/651,420

(22) Filed: Aug. 29, 2003

(65) Prior Publication Data

US 2005/0048305 A1    Mar. 3, 2005

(51) Int. Cl.
*B32B 15/00* (2006.01)
*B32B 15/04* (2006.01)
(52) U.S. Cl. .................. 428/469; 428/472; 428/701; 428/702; 416/241 R; 416/241 B
(58) Field of Classification Search .................. None
See application file for complete search history.

(56) References Cited

U.S. PATENT DOCUMENTS

| | | |
|---|---|---|
| 4,085,248 A | 4/1978 | Zehender et al. |
| 4,399,199 A | 8/1983 | McGill et al. |
| 4,587,172 A | 5/1986 | Roy et al. |
| 5,250,360 A | 10/1993 | Andrus et al. |

(Continued)

FOREIGN PATENT DOCUMENTS

EP    0 414 458 A1    8/1990

(Continued)

*Primary Examiner*—Jennifer McNeil
*Assistant Examiner*—Timothy M. Speer
(74) *Attorney, Agent, or Firm*—McNees Wallace & Nurick LLC

(57) ABSTRACT

A high temperature gas turbine component for use in the gas flow path that comprises a specular optical reflector coating system. A thin specular optical reflector coating system is applied to the gas flow path of the component, that is, the surface of the component that forms a boundary for hot combustion gases. The component typically includes a thermal barrier coating overlying the high temperature metallic component that permits the component to operate at elevated temperatures. The thermal barrier coating must be polished in order to provide a surface that can suitably reflect the radiation into the gas flow path. The thin reflector coating system comprises a thin high temperature and corrosion resistant refractory stabilizing layer, which is applied over a thin reflective metal layer, which is applied over a thin high temperature and corrosion resistant refractory sealing layer. The coating system is applied over the polished thermal barrier coating by a process that can adequately adhere the reflector to the polished surface without increasing the roughness of the surface. The coating system reflects radiation back into the hot gas flow path or into the atmosphere. The reflected radiation is not focused onto any other hardware component. The design of the component is such that the radiation is returned to the gas flow path or sent to the atmosphere rather than absorbed into a component that only serves to increase the temperature of such a component.

20 Claims, 2 Drawing Sheets

U.S. PATENT DOCUMENTS

| | | |
|---|---|---|
| 5,851,679 A | 12/1998 | Stowell et al. |
| 5,891,267 A | 4/1999 | Schaeffer et al. |
| 5,914,189 A | 6/1999 | Hasz et al. |
| 6,056,823 A | 5/2000 | Sajoto et al. |
| 6,077,562 A | 6/2000 | Dornfest et al. |
| 6,210,791 B1 | 4/2001 | Skoog et al. |
| 6,218,029 B1 | 4/2001 | Rickerby |
| 6,652,987 B2 * | 11/2003 | Allen et al. ............ 428/622 |
| 6,925,811 B2 * | 8/2005 | Justis et al. ............ 60/753 |

FOREIGN PATENT DOCUMENTS

| | | |
|---|---|---|
| EP | 1 008 672 A1 | 6/2000 |
| EP | 1 031 637 A1 | 8/2000 |
| EP | 0 784 104 B1 | 5/2001 |
| WO | WO 97 01436 A1 | 1/1997 |

* cited by examiner

OPTICAL REFLECTOR FOR REDUCING RADIATION HEAT TRANSFER TO HOT ENGINE PARTS

CROSS-REFERENCE TO RELATED APPLICATIONS

This Application is related to application Ser. No. 10/355,657, filed on Dec. 31, 2002, now U.S. Pat. No. 7,003,959, entitled "IMPROVED HIGH TEMPERATURE SPLASH PLATE FOR TEMPERATURE REDUCTION BY OPTICAL REFLECTION AND PROCESS FOR MANUFACTURING," assigned to the assignee by the present invention and which is incorporated herein by reference, application Ser. No. 10/335,647, filed on Dec. 31, 2002, now allowed, entitled "IMPROVED HIGH TEMPERATURE CENTERBODY FOR TEMPERATURE REDUCTION BY OPTICAL REFLECTION AND PROCESS FOR MANUFACTURING" assigned to the assignee of the present invention and which is incorporated herein by reference, application Ser. No. 10/335,486, filed on Dec. 31, 2002, now U.S. Pat. No. 6,926,496, entitled "IMPROVED HIGH TEMPERATURE TURBINE NOZZLE FOR TEMPERATURE REDUCTION BY OPTICAL REFLECTION AND PROCESS FOR MANUFACTURING," assigned to the assignee of the present invention and which is incorporated herein by reference, and application Ser. No. 10/335,442, filed on Dec. 31, 2002, now U.S. Pat. No. 6,925,811, entitled "IMPROVED HIGH TEMPERATURE COMBUSTOR WALL FOR TEMPERATURE REDUCTION BY OPTICAL REFLECTION AND PROCESS FOR MANUFACTURING" assigned to the assignee of the present invention and which is incorporated herein by reference.

FIELD OF THE INVENTION

The present invention is directed to high temperature reflectors, and in particular to high temperature reflectors applied to the surface of components of gas turbine engines to reduce the temperature of boundary walls of the hot section portions of the components by optical radiation generated by combustion.

BACKGROUND OF THE INVENTION

In the compressor portion of an aircraft gas turbine engine, atmospheric air is compressed to 10–50 times atmospheric pressure, and adiabatically heated to about 800°–1450° F. (425°–790° C.) in the process. This heated and compressed air is directed into a combustor, where it is mixed with fuel. The fuel is ignited, and the combustion process heats the gases to very high temperatures, in excess of 3000° F. (1650° C.). These hot gases pass through the turbine, where rotating turbine wheels extract energy to drive the fan and compressor of the engine, and the exhaust system, where the gases supply thrust to propel the aircraft, passing along the centerbody. To improve the efficiency of operation of the aircraft engine, combustion temperatures have been raised. Of course, as the combustion temperature is raised, steps must be taken to prevent thermal degradation of the materials forming the flow path for these hot gases of combustion.

Every aircraft gas turbine engine has a so-called High Pressure Turbine (HPT) to drive its compressor. The HPT sits just behind the compressor in the engine layout and experiences the highest temperature and pressure levels (nominally 2400° F. and 300 psia respectively) developed in the engine. The HPT also operates at very high speeds (10,000 RPM for large turbofans, 50,000 for small helicopter engines). In order to meet life requirements at these levels of temperature and pressure, HPT's today are always air-cooled and constructed from advanced alloys.

While a straight turbojet engine will usually have only one turbine section (an HPT), most engines today are of the turbofan, either high bypass turbofan or low bypass turbofan, or turboprop type and require one (and sometimes two) additional turbine(s) sections to drive a fan or a gearbox. The additional turbines are called the Low Pressure Turbines (LPT) and immediately follow the HPT in the engine layout. Since substantial pressure drop occurs across the HPT, the LPT operates with a much less energetic fluid and will usually require several stages (usually up to six) to extract the power required to perform its function.

In high-bypass fan turbofan engines the primary exhaust nozzle assembly consists of a centerbody and an outer barrel fairing. The turbine nozzle directs the primary gas aft and regulates the gas stream flow. The centerbody is aerodynamically shaped and has an outer surface that is located within the flow path of the hot core gas that has passed through the LPT. The outer surfaces of the outer fixed cowl provide a continuation of the fan flowpath. The nozzle outer barrel assembly is comprised of an outer cowl bolted to the inner barrel position called the primary nozzle. There are ports on the inner barrel to introduce engine low pressure recoup into the primary airstream. In low-bypass fan turbofan engines, the centerbody is not part of the primary exhaust nozzle assembly, but rather is positioned directly aft of the LPT and fore of the augmenter.

One well-known solution that has been undertaken to protect the metals that form the flow path for the hot gases of combustion, including those of the HPT, LPT, and primary nozzle assembly have included application of protective layers having low thermal conductivity. These materials are applied as thermal barrier coating systems (TBCs), typically comprising an overlying insulative ceramic top coat, typically a stabilized zirconia, and a bond coat that improves adhesion of the top coat to the substrate. These systems are known to improve the thermal performance of the underlying metals that form the flow path in the hot section of the engine. However, as temperatures of combustion have increased, even these TBCs have been found to be insufficient. While some modifications of the traditional flow path surfaces have been applied in the past, such as the application of materials over the TBC, these modifications have been directed to reducing the emissions of pollutants such as unburned hydrocarbons (UHC) and carbon monoxide (CO). One such modification is set forth in U.S. Pat. No. 5,355,668 to Weil, et al., assigned to the assignee of the present invention, which teaches the application of a catalyst such as platinum, nickel oxide, chromium oxide or cobalt oxide directly over the flow path surface of the thermal barrier coating of a turbine engine component. The catalyst layer is applied to selected portions of flow path surfaces to catalyze combustion of fuel. The catalytic material is chosen to reduce air pollutants such as unburned hydrocarbons (UHC) and carbon monoxide (CO) resulting from the combustion process. The catalytic layer is applied to a thickness of 0.001 to 0.010 inches and is somewhat rough and porous, having a surface roughness of about 100 to 250 micro inches, in order to enhance the surface area available to maximize contact with the hot gases in order to promote the catalytic reaction. The rough surface assists in creating some turbulence that promotes contact with the catalytic surface.

As temperatures of gas turbine engines have continued to increase, the combustion temperatures have become sufficiently high that even the best superalloy materials exhibit shortened lives due to thermal degradation. This is true even of the superalloys used for splash plates in high efficiency, advanced cycle turbine engines, which are prone to failure by thermal degradation. As combustion temperatures have increased, the impingement cooling and thermal barrier coatings have been inadequate to provide sufficient cooling to maintain component life without thermal degradation. Various attempts have been made to improve the resistance to thermal degradation, which have provided incremental improvements. These have included high temperature reflectors referred to as "Spray and Bake" coatings. These reflectors include platinum paints and platinum layers applied by chemical vapor deposition deposited over silicon dioxide ($SiO_2$). These reflectors act by reflecting heat away from the splash plate rather than having the heat absorbed by the splash plate, conducted through the splash plate and then removed from the back side (or upstream side) of the splash plate by convection. Ideally, the heat is reflected back into the flow of combustion gases moving downstream into the turbine portion of the engine. However, these "Spray and Bake" coatings become ineffective as the temperatures rise above about 1600° F. (870° C.).

The prior art solutions are either directed to problems that are unrelated to the problem of high temperature degradation experienced by gas turbine components, such as the Weil patent, or provide different solutions to the problem of high temperatures resulting from the combustion process. What is needed is a cost effective coating system that can act as a reflector to assist in cooling a thin splash plate by reflecting radiative heat back into the combustion gas stream. The coating must be sufficiently thin so as not to increase the weight of the component substantially, yet reduce the radiative heat absorbed by the engine components so that the components experience less thermal degradation, which ultimately requires component replacement.

The present invention therefore provides a different approach to solving the problem of high temperatures experienced by gas turbine engine component.

SUMMARY OF THE INVENTION

The present invention is a specular optical reflector system for use on high temperature gas turbine components for use in the hot gas flow path of a gas turbine engine. The gas turbine component is positioned in the hot section of the engine, behind the turbine section and reflects heat radiation, for example, infrared radiation, from the turbine region back into the hot core gas flow path or into the atmosphere. The reflected radiation is focused away from any other hardware component in the HPT, LPT or primary nozzle region so that the radiative heat passes out the nozzle and into either the augmentor or the atmosphere, depending upon the type of engine. The design of the component is such that the radiation is returned to the gas flow path rather than absorbed into a component wall, which only serves to increase the temperature of the wall.

A specular reflector system, comprising a sealing layer of Tantalum Oxide ($Ta_2O_5$) or other material applied over the substrate that is unreactive in a high-temperature and corrosive environment, a thin layer of platinum applied over the sealing layer, and a stabilizing layer of $Ta_2O_5$ or other material that is unreactive in a high-temperatures and corrosive environment is applied over the platinum layer to the flow path surface of the component, that is, the surface of the component that forms a boundary for combustion gases and/or hot core gases in the vicinity of the component. As used herein, the term "substrate" includes conventional turbine components found in jet engines, including well-known thermal barrier systems and coatings applied to such components to improve thermal and environmental performance. Generally, combustion gases are present in the region of the gas turbine engine where the flame is produced and combustion gas temperatures are generally greater than about 4000° F. (2200° C.). Core gases are combustion gases that have been mixed with cooling air or other air that does not flow from the combustion region. Hot core gases are generally in the region of about 1600° F. (870° C.) to about 2200° F. (1200° C.).

The high temperature specular reflector system must be applied as an optically smooth coating. The component typically comprises a bond coat and a thermal barrier coating (TBC) layer overlying the high temperature metallic component that permits the component to operate at elevated temperatures. The TBC layer, which is well known in the art, typically comprises a ceramic material. The bond coat is located between the TBC and the component. The TBC layer applied to the component typically is rough and must be polished in order to provide a sufficiently smooth surface that can suitably reflect the radiation into the gas flow path. In the present invention, the surface of the TBC is finished by polishing to a near flat, specular surface. The specular reflective system of the present invention then is applied by a process that can adequately adhere the reflector to the polished TBC surface without increasing the roughness of the surface. First, a first sealing layer of $Ta_2O_5$ or other suitable material that is unreactive and is not substantially affected by a high-temperature and corrosive environment is applied to the polished TBC surface. A thin layer of platinum having a thickness in the range of about 1500 angstroms to about 10000 angstroms is applied overlying the $Ta_2O_5$ layer. The platinum is then polished to a mirror-like finish. In order to prevent spallation of the platinum and/or the coalescence of the platinum into large three-dimensional islands during operation, a stabilizing layer of $Ta_2O_5$ or other material that is unreactive and is not substantially affected by a high-temperature and corrosive environment is applied over the polished platinum layer.

The high temperature specular reflective system can be applied to any surface aft of the compressor, but is most beneficially used in the combustor or exhaust portion of the engine, for instance, a combustor wall, high pressure turbine components, low pressure turbine components, the primary exhaust nozzle, and the centerbody portion of the engine. For military aircraft, the high temperature specular reflective system may also be beneficially used in the augmentor portion of the engine.

An advantage of the present invention is that the radiation from the combustion process is reflected back into the gas flow path. This radiative heat, rather than being absorbed by a component in the combustor, HPT, LPT, or primary exhaust nozzle portion of the engine, is absorbed by the fluid and carried back into portions of the engine further aft that currently operate at cooler temperatures, or out into the atmosphere. The result is that the component does not become as hot. At a given temperature of operation of the engine, the component, because it is operating at a cooler temperature, will not deteriorate as rapidly due to thermal degradation, resulting in longer component life and less mean time between repair or refurbishment.

Another advantage of the present invention is that the fluid stream will be heated to a higher temperature as the reflected radiation is absorbed by the materials comprising the gaseous fluid and carried from the combustor portion of the engine into the aft turbine portions of the engine. This increased fluid temperature translates into increased engine efficiency, as the available energy in the fluid stream for both extraction by the turbine to operate the engine and for thrust to propel the aircraft is greater.

Still another advantage of the present invention is that the engine can be operated at an even higher temperature than currently experienced using the current invention if shortened component life and increased repair rates can be tolerated in exchange for even greater efficiency.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

In accordance with the present invention, hot section components of a gas turbine engine which form the boundary of the gas flow path or which are located in the gas flow path are coated with a specular optical reflective material that has a high temperature capability. The specular reflective system as applied has a smooth surface finish so as to specularly reflect the heat back into the fluid path and away from other hot section components. The specular reflective system includes a sealing layer and a stabilizing layer in addition to the reflective layer.

Figure 1:
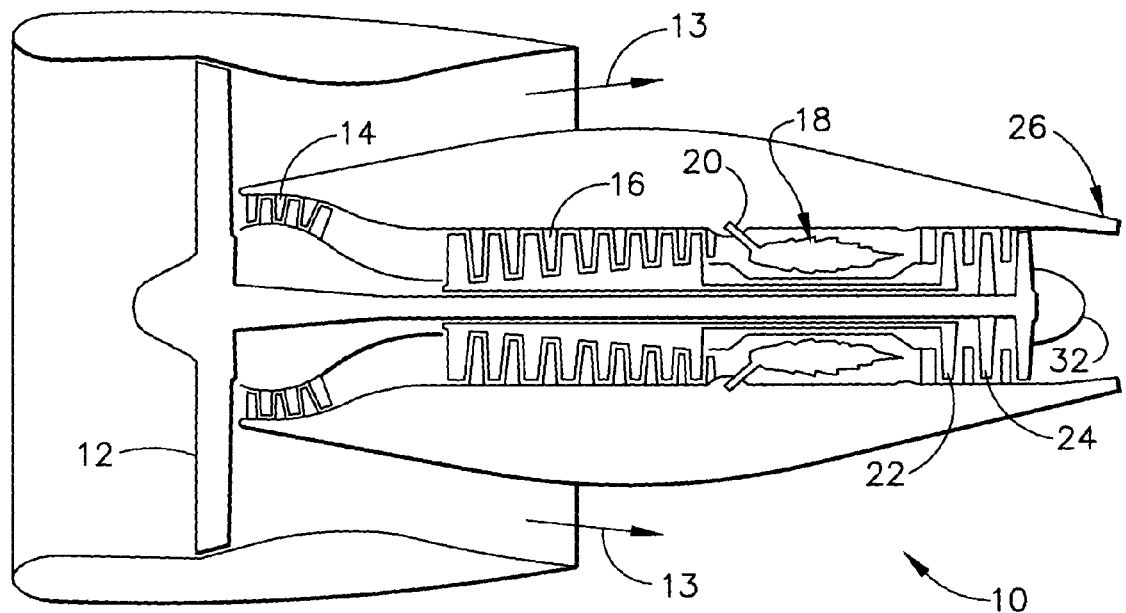
FIG. 1 is a schematic representation of a high bypass turbofan gas turbine engine.

A high bypass aircraft gas turbine engine 10 is shown schematically in FIG. 1. During operation, air is forced through the fan 12. A portion of the air bypasses the core of the engine and is used to contribute to the thrust that propels the engine as indicated by arrows 13. The remaining air passes into the core and is compressed in the booster 14 and compressor 16 portions of the engine up to 10–50 times atmospheric pressure, while being adiabatically heated to 800° F.–1450° F. (425° C.–780° C.) in the process. This heated and compressed air is directed into the combustor portion of the engine 18, where it is mixed with fuel supplied through a fuel nozzle system 20. The fuel is ignited, and the combustion process produces gases having temperatures typically on the order of 3200° F.–3400° F., but as high as (1760° C.–1870° C.). These hot gases pass through the high pressure 22 and low pressure 24 turbines, where turbine blades on rotating discs extract energy to drive the fan and compressor of the engine. Once the hot gases pass through the high pressure turbines, the hot gases are considered to be core gases, rather than combustion gases, as energy has been extracted and air cooling the combustor and high pressure engine components has been mixed with it. The gases then are passed to the exhaust system 26, which includes the centerbody 32, where they contribute to thrust for aircraft propulsion.

Figure 2:
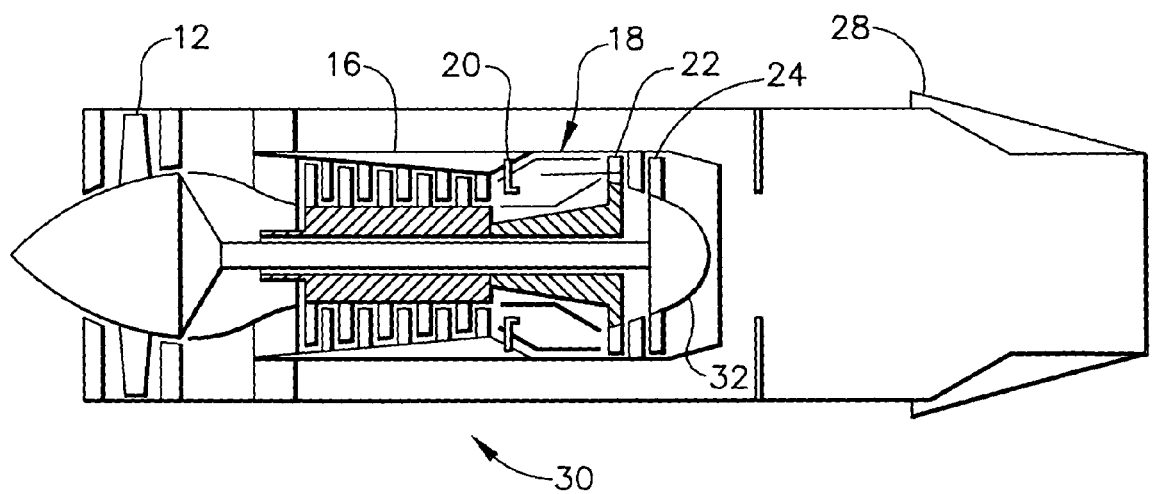
FIG. 2 is a schematic representation of a low bypass turbofan gas turbine engine equipped with an augmentor.
Figure 3:
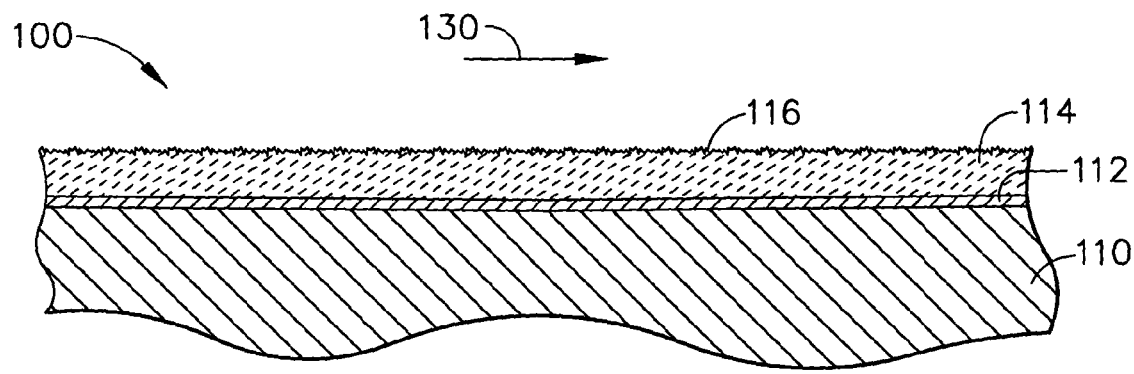
FIG. 3 is a cross-section of a representative as-manufactured gas turbine engine component after application of a conventional thermal barrier coating.

Operation of a low bypass gas turbine engine, shown schematically at 30 in FIG. 2, is similar, except that operational requirements may dictate omission of the booster 14 and addition of an augmentor 28 in the exhaust system shown at 26 in FIG. 1. In a low bypass gas turbine engine, the centerbody 32 is not part of the exhaust system. To emphasize the conceptual similarity, the same identification numerals are employed in both figures.

Additionally, the surface of many of the engine components are also coated with thermal barrier coating systems, which comprise a bond coat applied between an underlying superalloy base material and an overlying ceramic TBC layer, to create a thermal barrier coating system that reduces the flow of heat to the substrate material. These TBC systems typically employ active cooling systems to remove heat and prevent heat build-up. Systems for providing thermal barrier coating systems are well-known in the gas turbine engine art.

Materials employed in the combustor, turbine and exhaust system sections of aircraft gas turbines are typically nickel-based, cobalt-based, or iron-based high temperature superalloys or combinations thereof. All of these superalloys are believed to be suitable substrate materials for the present invention. Also, monolithic ceramic materials and ceramic matrix composite materials, described herein collectively as ceramic composite materials, may be employed in the combustor, turbine and exhaust systems sections of an aircraft gas turbine. Such ceramic composite materials are specifically contemplated for use in the present invention, and may have slightly higher temperature limits than the high temperature superalloys used for combustors.

Even for gas turbine engines designed for commercial airliners, gas velocity through the engine may approach the speed of sound. Thus, the total gas residence time in the engine is but a small fraction of a second, during which time air coming through the compressor is mixed with liquid fuel, and combustion of the mixture occur. As the mixture is combusted at temperatures above 3000° F. (1650° C.) to form a gas, heat, including radiant heat in the infrared range, is generated. Even with the most recent advances in cooling measures used in gas turbine engines such as active cooling controls and advanced thermal barrier coating systems which reduce the amount and/or rate of heat transferred to components due to convective and conductive heat transfer, the temperatures of the components along the flow path surface are still elevated to very high temperatures. The present invention assists in reducing the amount of heat transferred to these components by radiation heat transfer.

The present invention utilizes a specular optical reflector coating system applied directly over existing ceramic materials such as thermal barrier systems utilized to protect the substrate material. These specular optical reflector systems are applied as three very thin coatings, with the reflective metal layer sandwiched between two layers of a refractory material that does not react with the corrosive hot gases of combustion and does not melt at the high temperatures created by the combustion process. The present invention may be applied to any gas turbine components aft of the compressor. The present invention desirably only be applied to components or portions of components that will enable incident radiation to be reflected back into the hot gas stream of the engine. The present invention should not be applied to components or portions of components that would cause incident radiation to be reflected and/or focused into other components, which would cause the temperature of the other components to increase, rather than back into the hot gas stream. Conventional and well known techniques for applying thermal barrier coatings provide surfaces that are much too rough for the thin coatings to act as optical reflectors. When these specular optical reflector systems are applied over conventional thermal barrier coatings having surface finishes of 100 micro inches and greater, the rough surface causes the radiation to be scattered in multiple of different directions and are substantially ineffective in transferring heat back into the rapidly moving fluid. When the coatings are porous, such as when used for as a catalytic coating, the radiation is reabsorbed into the substrate, so it cannot be used as an optical reflector.

Figure 4:
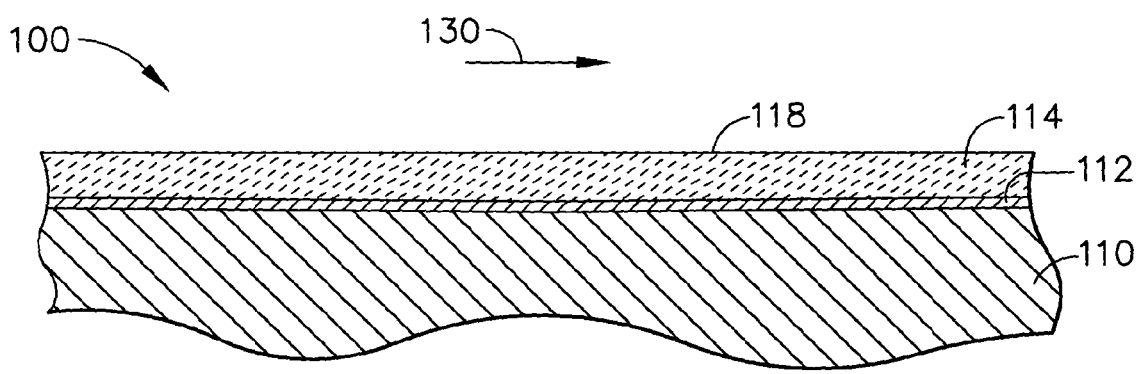
FIG. 4 is a cross-section of the representative gas turbine component after the outer surface of the thermal barrier coating has been smoothed to achieve a surface finish of 50 micro inches or finer.

In one embodiment of the present invention, an aircraft engine component that will be exposed to the hot gases of combustion and/or hot core gas flow, is manufactured in accordance with standard manufacturing methods. Referring to FIG. 4, component 100 comprises a substrate 110 suitable for use at high temperatures. As discussed above, the substrate can be selected from several materials. However, as illustrated in FIG. 4, substrate 110 is a high temperature nickel based superalloy. A bond coat 112 is applied over the nickel based superalloy substrate. Overlying bond coat 112 is a ceramic TBC layer 114 having a surface 115 that has a rough surface finish. Apertures that provide air for active cooling have been omitted for simplicity, but are typically present. As used herein, the term "rough surface finish" is one that is greater than about 100 micro inches. When the substrate is selected from one of the available different materials, such as a ceramic composite material, the bond coat 112 may be omitted.

Figure 5:
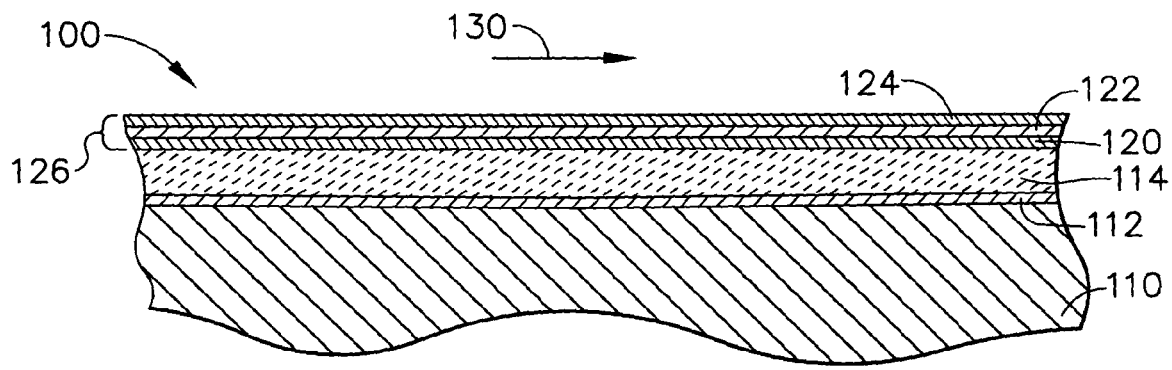
FIG. 5 is a cross-section of the representative gas turbine component after the optical reflector system of the present invention has been applied over a smooth thermal barrier coating.

The surface finish of the thermal barrier coating system is typically too rough to act as a substrate for a specular optical reflector system because of the manufacturing techniques used to apply the ceramic top coat. The outer rough surface 116 of the TBC layer 114 overlying the substrate surface is then polished. In one embodiment, the rough surface 116 is polished using fine emery paper so that the now smooth surface 118 of the TBC layer 114, as shown in FIG. 5, has a surface finish of no greater than about 50 micro inches, preferably about 32 micro inches and smoother. This smooth surface is required to achieve the reflective properties required for the present invention. In production, well known polishing techniques such as lapper wheels with diamond paste and tumbling can be employed to speed the polishing process and increase throughput. Any process that can achieve the surface finish can be used. Although the TBC layer 114 has been polished, the smooth surface 118 still contains microcracks that would eventually allow a subsequently deposited reflective metal layer 122 to diffuse into the TBC layer 114 during normal engine operation, if such reflective metal layer 122 was deposited directly on top of TBC layer 114.

Next, the smooth surface 118 of the TBC layer 114 is coated with a very thin sealing layer 120 of a refractory material that does not react with the corrosive hot gases of combustion and does not melt or degrade at the high temperatures created by the combustion process, as shown in FIG. 6, that will seal microcracks in the smooth surface 118 of the TBC layer 114. However, the sealing layer is sufficiently thin that apertures providing active cooling are unaffected. The sealing layer 120 is applied by a process that deposits material so that a very smooth surface finish is maintained. The sealing layer 120 seals and smoothes out some of the micro cracks present in the smooth surface 118. A preferred method is a chemical vapor deposition (CVD) process that deposits a coating to a thickness up to about 10 micron (0.0004"). Other acceptable methods for depositing the sealing layer 120 up to a thickness of about 10 micron include RF or DC sputtering, liquid phase or sol-gel infiltration and physical vapor deposition. However, not all methods for depositing a coating produce a sealing layer consistent with this invention. Other methods such as thermal spray methods do not produce an acceptable coating for the specular reflection system sealing layer 120, as the coatings deposited by these processes are too thick and too rough. In a preferred embodiment, the sealing layer 120 has a thickness in the range of about 1 micron to about 10 microns. In a most preferred embodiment, the sealing layer 120 has a thickness in the range of about 2 microns. The process used to deposit the coating must be consistent with deposition of a smooth layer 120 no greater than about 50 micro inches, preferably about 32 micro inches and smoother. The thickness of the sealing layer 120 is most preferably maintained at a thickness of about 2 microns because of the expense of the material used as the sealing layer 120 and because of the increase in strain for thicker layers, which may cause a very thick layer thicker than about 10 micron to spall off of the TBC layer 114. While an applied sealing layer may be rougher and subsequently polished to produce the required surface finish, it is desirable to avoid this additional step whenever possible because of the added expense. The specular sealing material for the sealing layer 120 is selected from the group consisting of tantalum oxide ($Ta_2O_5$), zirconia ($ZrO_2$), hafnia ($HfO_2$), alumina ($AlO_2$), baria (BaO), strontia (SrO), calcia (CaO), silica ($SiO_2$), titanium dioxide ($TiO_2$), rare earth oxides, and combinations thereof. The preferred specular sealing material is tantalum oxide ($Ta_2O_5$). In addition to sealing the TBC layer 114, the sealing layer 120 serves as a diffusion barrier, preventing the subsequently applied reflective metal layer 122 from diffusing into the TBC layer 114. The very thin sealing layer 120, in addition to being less expensive than a thicker layer, is extremely adherent to the polished TBC, and, due to its thinness, does not peel or spall off in layers, which peeling can adversely affect its function as a diffusion barrier. The thin sealing layer 120 does not provide a severe weight penalty for the components to which it is added. In addition, the sealing layer 120 is maintained as a thin smooth layer to allow the surface finish of the reflective metal layer 122 to be of high reflective, optical quality.

Once the sealing layer 120 has been applied to the TBC layer 114, a reflective metal layer 122 is applied to the sealing layer 120. Platinum is preferably used for the metal reflective layer 122 of the present invention because it has the highest melting point of any highly reflective metal, making it well suited for use with hot turbine engines. Optionally, other highly reflective metals with relatively high melting points, such as palladium or rhodium can also be used for the reflective metal layer 122. The reflective metal layer 122 is applied by a process that deposits material so that a very smooth surface finish is maintained. A preferred method is a chemical vapor deposition (CVD) process that deposits a coating to a thickness of about 1500 angstrom to about 10000 angstrom. In a more preferred embodiment, the reflective metal layer 122 has a thickness of about 5000 angstrom. Other acceptable methods for depositing this thin reflective metal layer 122 to a thickness of about 1500 angstrom to about 10000 angstrom include sputtering, liquid phase infiltration, non-line of sight physical vapor deposition, electroless plating, evaporation, or other line of sight physical vapor deposition methods known in the art. If the substrate 110 is substantially flat, then sputtering, evaporation, or a line of sight physical vapor deposition method is appropriate. If the substrate 110 is not substantially flat, then liquid phase or sol-gel infiltration, electroless plating, or a non-line of sight physical vapor deposition is appropriate. The thickness of the layer 122 affects cost, so a very thin layer 122 is preferred. Even these methods may require some additional fine (light) polishing to achieve the desired, preferred, extremely smooth surface finish of 10–20 micro inches, providing the reflective metal layer 122 with a fine mirror-like finish. However, not all methods for depositing a coating produce a reflective metal layer 122 consistent with this invention. Other methods such as thermal spray methods do not produce an acceptable coating for specular reflection, as the coatings deposited by these processes are too thick and too rough. The reflective metal layer 122 does not diffuse into the TBC layer 114 because the underlying sealing layer 120 functions as a diffusion barrier coating, preventing the platinum from diffusing into the TBC layer. The very thin reflective metal layer 122, in addition to being less expensive than a thicker layer, is extremely adherent to the sealing layer 120. The thin reflective metal layer 122 does not provide a severe weight penalty for the components to which it is added. In addition, the reflective layer 122 is maintained as a thin layer to allow the surface finish of the layer to be of high reflective, optical quality.

Once the reflective metal layer 122 has been applied to the sealing layer 120, a smooth stabilizing layer 124 is applied to the reflective metal layer 122 to prevent the coalescence of the metal in the reflective metal layer 122 into large three dimensional islands and/or the spallation of the metal off of the underlying sealing layer 120. The stabilizing layer 124 is applied by a process that deposits material so that a very smooth surface finish is maintained on the surface of the reflective metal layer 122. A preferred method for depositing the stabilizing layer 124 is a chemical vapor deposition (CVD) process that deposits a coating to a thickness in the range of about of about 0.5 microns to about 10 microns. In a more preferred embodiment, the stabilizing layer 124 is deposited to a thickness of about 1 micron. Other acceptable methods for depositing this thin specular sealing layer 124 to a thickness of about 0.5 micron to about 10 micron include RF and DC sputtering, liquid phase or sol-gel infiltration, non-line of sight physical vapor deposition, electroless plating, evaporation, or other line of sight physical vapor deposition methods known in the art. If the substrate 110 is substantially flat, then sputtering, evaporation, or a line of sight physical vapor deposition method is appropriate. If the substrate 110 is not substantially flat, then liquid phase or sol-gel infiltration, electroless plating, or non-line of sight physical vapor deposition is appropriate. However, not all methods for depositing a coating produce a stabilizing layer consistent with this invention. Other methods such as thermal spray methods do not produce an acceptable coating for specular reflection, as the coatings deposited by these processes are too thick and too rough. The thickness of the stabilizing layer 124 can be greater, for example 10 microns or less but is maintained at about 1 micron because of the expense of the material used for the stabilizing layer and because of the increase in strain for thicker layers, which may cause a very thick layer, thicker than about 10 microns, to spall off of the metal layer 122. The process used to deposit the coating must be consistent with deposition of a smooth layer 124 no greater than about 50 micro inches, preferably about 32 micro inches and smoother. The specular stabilizing material must be a refractory material that does not react with the corrosive hot gases of combustion, does not melt or degrade at the high temperatures created by the combustion process, and is transparent so that radiation can be reflected from the underlying metal layer 122. A preferred specular sealing material for the stabilizing layer 124 is selected from the group consisting of tantalum oxide ($Ta_2O_5$), zirconia ($ZrO_2$), hafnia ($HfO_2$), alumina ($AlO_2$), baria (BaO), strontia (SrO), calcia (CaO), silica ($SiO_2$), titanium dioxide ($TiO_2$), rare earth oxides, and combinations thereof. The preferred specular sealing material is tantalum oxide ($Ta_2O_5$). In order for the specular optical reflective system of the present invention to properly function, it is necessary that the reflective metal layer remain highly reflective as the hot gas stream 130 passes over the surface of the specular optical reflective system 126. Thus, the stabilizing layer 124 additionally prevents the formation of oxide scales or deposition of products of combustion on the surface of the reflective metal layer 122, since such scales destroy the effectiveness of the reflective metal layer 122 as a reflector. Also, the very thin stabilizing layer 124, in addition to being less expensive than a thicker layer, is extremely adherent to the reflective metal layer 122, and, due to its thinness, does not spall or peel off in layers, which peeling can adversely affect the reflective properties of the specular optical reflective system 126. The thin stabilizing layer 126 does not provide a severe weight penalty for the components to which it is added. In addition, the stabilizing layer is maintained as a thin layer to allow the surface finish of the reflective metal layer 122 be of high reflective, optical quality.

The specular optical reflective system 126 of the present invention may be used in any high temperature device in which hot gaseous fluids traverse the device in a hot flow path, and is sufficiently thin that it does not affect any active cooling apertures that may be present on the surfaces to which it is applied. The specular optical reflective system 126 may be applied to any component substrate having a surface that forms a boundary for such hot gaseous fluids of combustion. In the case of gas turbine engines, such components include components aft of the compressor portion of the engine 16, including turbine nozzles, centerbodies, high pressure turbine blades, high pressure turbine nozzles, low pressure turbine blades, low pressure turbine nozzles, combustor walls, splash plates, afterburner nozzles, flaps, seals, flameholders, liners, and other similarly situated components.

Testing of TBC covered metal articles with the specular optical reflective system of the present invention applied to the surface of the TBC layers has indicated that a specular optical reflective system of the present invention can reflect at least about 80% up to about 97% of the incident radiation in the spectral region of combusting flame radiance, which has a wavelength that is in the range of about 1 micron to about 2.5 microns, and can reflect about 75% to about 97% of hot part radiance, which has a wavelength that is in the range of about 2 microns to about 15 microns. Furthermore, the specular optical reflective system of the present invention is operable at surface temperatures of about 2400° F. (1315° C.), whereas "Spray and Bake" coatings are only operable at temperatures up to about 1600° F. (870° C.) it being understood that fluid gas temperatures are significantly higher than surface temperatures.

Testing of reflective substrates has indicated that a specular reflective system can reflect an amount of incident radiation sufficient to lower the temperature of a component by up to about 100° F. (55° C.) when the temperature of a ceramic coating adjacent to the fluid stream is at 2300° F. (1260° C.) as compared to a component having only a ceramic coating but without the specular reflective system. These components with the specular coating system have displayed an improvement of about 95° F. (55° C.), as measured by thermocouples attached to deflectors in a high pressure sector test for approximately 100 hours, as compared to a substantially identical deflector that lacked a system such as described by the present invention.

Furnace cycle testing ("FCT") of a coupon coated with a TBC, which was coated with the specular optical coating system of the present invention, has shown no decrease in lifetime of the coupon. FCT of the coupon was run for 400 one-hour cycles, with the each one-hour cycle having the furnace temperature being held at about 2075° F. (1135° C.) for about 45 minutes followed by a 15 minute decrease in temperature to a temperature of about 200° F. (95° C.) followed by an increase back to about 2075° F.

While the present invention has been described as a system for use on the high temperature components of a gas turbine engine, the present invention can be applied to any other surface along the gas flow path of a turbine engine or other high temperature devices, such as a continuous furnace or a burner which is exposed to radiative energy. For example, the specular optical reflective system can be applied to the combustor walls, so that any incident radiation is reflected away from the combustor walls and into the gas flow path. Because at least a portion of the energy is reflected from the components comprising the gas flow path, thereby lowering their temperature, the radiation is absorbed by the gases in the gas flow path, thereby raising its temperature.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A component having a specular reflective system for use in a hot flow path of a high temperature device exposed to radiative energy in which hot gaseous fluids traverse the device in a hot flow path, the component comprising:
   a substrate material having a surface that forms a fluid boundary for hot gaseous fluids of combustion; and
   a specular optical reflective coating system comprising three layers, each layer having a preselected thickness, overlying the substrate surface forming the hot fluid boundary, the coating system having a reflective metal layer positioned between a first refractory layer and a second refractory layer, said first refractory layer positioned between the reflective metal layer and the substrate surface, said reflective metal layer having an applied roughness sufficiently smooth to reflect at least about 80% of incident radiation and at least about 75% of hot part radiation, said coating system having a high temperature capability to survive temperatures in the hot flow path so that the coating system reflects at least about 80% of incident radiation away from its surface to the fluids transversing the hot flow path, and wherein the coating system is not subject to oxidation due to contact with the hot gaseous fluids.

2. The component of claim 1 wherein the reflective metal layer has a preselected surface finish in the range of about 10 micro inches to about 20 micro inches.

3. The component of claim 1 wherein the substrate material includes a ceramic material overlying a high temperature superalloy material, the specular reflective coating system overlying the ceramic material, the ceramic material forming a thermal barrier overlaying the superalloy material, a surface of the ceramic material opposite the superalloy material and adjacent the specular reflective coating system having a preselected surface finish no greater than about 50 micro inches.

4. The component of claim 3, wherein the ceramic material has a preselected surface finish of about 32 micro inches and smoother.

5. The component of claim 3, wherein the material of the specular reflective coating system comprising the first refractory layer is selected from the group consisting of tantalum oxide, zirconia, hafnia, alumina, baria. strontia, calcia, silica, titanium dioxide, rare earth oxides, and combinations thereof and wherein the material of the specular reflective coating system comprising the second refractory layer is selected from the group consisting of tantalum oxide, zirconia, hafhia, alumina, baria. strontia, calcia, silica, titanium dioxide, rare earth oxides, and combinations thereof.

6. The component of claim 5, wherein the material used for both the first and second refractory layers is tantalum oxide.

7. The component of claim 3, wherein the preselected thickness of the first refractory layer is in the range of about 1 micron to about 10 microns, wherein the preselected thickness of the reflective metal layer is in the range of about 1500 angstrom to about 10000 angstrom, and wherein the preselected thickness of the second refractory layer is in the range of about 0.5 microns to about 10 microns.

8. The component of claim 7, wherein the preselected thickness of the first refractory layer is about 2 microns, wherein the preselected thickness of the reflective metal layer is about 5000 angstrom, and wherein the preselected thickness of the second refractory layer is about 1 micron.

9. The component of claim 3 further characterized by a temperature performance improvement of about 100° F. when the temperature of the fluids of combustion are about 2300° F. as compared to a component without the specular reflective coating system.

10. The component of claim 8 further characterized by a temperature performance improvement of about 100° F. when the temperature of the fluids of combustion are about 2300° F. as compared to a component without the specular reflective coating system.

11. The component of claim 1, wherein the reflective metal layer is platinum.

12. A specular reflecting system applied over a substrate, comprising:
   a sealing layer having a preselected thickness up to about 10 microns, and a preselected surface roughness no greater than about 50 micro inches, and selected from the group consisting of tantalum oxide, zirconia, hafnia, alumina, baria, strontia, calcia, silica, titanium dioxide, rare earth oxides, and combinations thereof;
   a reflective layer having a preselected thickness up to about 10000 angstrom, and a preselected surface roughness no greater than about 20 micro inches, and selected from the group consisting of platinum, palladium, rhodium, and combinations thereof; and a surface layer having a thickness up to about 10 microns, and a surface roughness no greater than about 50 micro inches, and selected from the group consisting of tantalum oxide, zirconia, hafnia, alumina, baria, strontia, calcia, silica, titanium dioxide, rare earth oxides, and combinations thereof.

13. The specular reflecting system of claim 12, wherein the material used for the sealing layer is tantalum oxide.

14. The specular reflecting system of claim 12, wherein the material used for the surface layer is tantalum oxide.

15. The specular reflecting system of claim 12, wherein the substrate is ceramic overlying a high temperature superalloy.

16. The specular reflecting system of claim 14, wherein the substrate has a preselected surface finish of about 32 micro inches and smoother.

17. The component of claim 12, wherein the preselected thickness of the sealing layer is about 2 microns, wherein the preselected thickness of the reflective metal layer is about 5000 angstrom. and wherein the preselected thickness of the second refractory layer is about 1 micron.

18. The component of claim 12, wherein the reflective layer is platinum.

19. A high pressure turbine blade having a ceramic thermal barrier coating, which is coated with the specular reflecting system of claim 12.

20. The high pressure turbine blade of claim 19, further characterized by a temperature performance improvement of about 100° F. when the temperature of the fluids of combustion are about 2300° F. as compared to a component without the specular reflective coating system.

* * * * *

UNITED STATES PATENT AND TRADEMARK OFFICE
CERTIFICATE OF CORRECTION

PATENT NO. : 7,208,230 B2  
APPLICATION NO. : 10/651420  
DATED : April 24, 2007  
INVENTOR(S) : Ackermann et al.

It is certified that error appears in the above-identified patent and that said Letters Patent is hereby corrected as shown below:

Claim 5, Column 12, Line 23: "baria. strontia" should be --baria, strontia--  
Claim 5, Column 12, Line 28: "hafhia, alumina, baria. strontia" should be --hafnia, alumina, baria, strontia--  
Claim 12, Column 13, Line 1: "grcater" should be --greater--  
Claim 17, Column 14, Line 5: "angstrom. and" should be --angstrom, and--

Signed and Sealed this

Fifth Day of June, 2007

JON W. DUDAS  
*Director of the United States Patent and Trademark Office*